(12) United States Patent
Mason et al.

(10) Patent No.: US 12,285,843 B2
(45) Date of Patent: Apr. 29, 2025

(54) CONTROL SYSTEM FOR ABRASIVE BLASTING APPARATUS AND ABRASIVE BLASTING APPARATUS

(71) Applicant: Elcometer Limited, Manchester (GB)

(72) Inventors: Ian Mason, Cheshire (GB); John Grimshaw, Oldham (GB); Michael Carrington Sellars, Cheshire (GB)

(73) Assignee: Elcometer Limited, Manchester (GB)

( * ) Notice: Subject to any disclaimer, the term of this patent is extended or adjusted under 35 U.S.C. 154(b) by 956 days.

(21) Appl. No.: 17/237,368

(22) Filed: Apr. 22, 2021

(65) Prior Publication Data

US 2021/0331290 A1    Oct. 28, 2021

(30) Foreign Application Priority Data

Apr. 22, 2020 (GB) ........................... 2005855

(51) Int. Cl.
    *B24C 7/00*       (2006.01)

(52) U.S. Cl.
    CPC .......... *B24C 7/0053* (2013.01); *B24C 7/0046* (2013.01)

(58) Field of Classification Search
    CPC ... B24C 7/0046; B24C 7/0053; B24C 7/0063; B24C 7/0015; B24C 7/0023; B24C 5/02
    (Continued)

(56) References Cited

U.S. PATENT DOCUMENTS 4,062,135 A * 12/1977 Dobberpuhl .............. E01H 5/09
                                                                56/10.8
4,075,789 A    2/1978 Dremann
(Continued)

FOREIGN PATENT DOCUMENTS

GB    2175976 A * 12/1986 .............. B24C 5/02
GB    2230485 A    10/1990
(Continued)

OTHER PUBLICATIONS

European Search Report for application No. EP21275046, dated Sep. 8, 2021, from the European Patent Office.
(Continued)

*Primary Examiner* — Brian D Keller
*Assistant Examiner* — Marcel T Dion
(74) *Attorney, Agent, or Firm* — Gerald T. Gray; Leydig, Voit, Mayer, LTD.

(57) ABSTRACT

A control system for controlling abrasive blasting apparatus and an abrasive blasting apparatus including such a control system. The control system controls delivery of air and blast media to a blast nozzle of the abrasive blasting apparatus. The control system includes a deadman's switch, the deadman's switch features a user operable control. The user operable control is moveable from a first position, where the control system causes the abrasive blasting apparatus to not deliver air or blast media, to a second position where the control system causes the abrasive blasting apparatus to deliver both air and blast media. When the user operable control is in an intermediate position between the first and second positions, the control system causes the abrasive blasting apparatus to deliver air but not blast media. The control system may have control elements whose state may be sequentially changed by the user operable control as it moves.

20 Claims, 4 Drawing Sheets

(58) Field of Classification Search
USPC .......................................................... 451/101
See application file for complete search history.

(56) References Cited

U.S. PATENT DOCUMENTS

| | | | | |
|---|---|---|---|---|
| 4,135,068 | A | * | 1/1979 | Burns ........................ B24C 7/00 451/99 |
| 4,802,313 | A | | 2/1989 | Smith |
| 5,024,029 | A | | 6/1991 | Abbott et al. |
| 5,216,848 | A | * | 6/1993 | Abbott ..................... B05B 15/63 451/75 |
| 5,601,478 | A | * | 2/1997 | Mesher ...................... B24C 7/00 451/75 |
| 8,288,670 | B2 | * | 10/2012 | Nguyen ................. B60K 28/14 200/335 |
| 8,961,271 | B2 | | 2/2015 | Roden |
| 11,179,827 | B1 | * | 11/2021 | Lambrinos ................ B24C 9/00 |
| 2007/0181836 | A1 | * | 8/2007 | Nguyen ................. F16K 11/048 251/231 |
| 2016/0016289 | A1 | | 1/2016 | Benson |
| 2018/0130613 | A1 | | 5/2018 | Nguyen et al. |
| 2020/0094377 | A1 | | 3/2020 | Turner et al. |
| 2020/0121965 | A1 | * | 4/2020 | Alexander ............. A62C 31/03 |
| 2022/0379435 | A1 | * | 12/2022 | Thomas .................... B24C 5/02 |

FOREIGN PATENT DOCUMENTS

| | | |
|---|---|---|
| WO | WO 93/19685 A1 | 10/1993 |
| WO | WO 2019/057738 A1 | 3/2019 |

OTHER PUBLICATIONS

Walbeoff, Search Report under Section 17 dated Oct. 12, 2020, in Application No. GB2005855.8 from Intellectual Property Office.

\* cited by examiner for a predetermined period after the first control element permits the delivery of air.

CONTROL SYSTEM FOR ABRASIVE BLASTING APPARATUS AND ABRASIVE BLASTING APPARATUS

TECHNICAL FIELD

The present invention relates to a control system for abrasive blasting apparatus and to abrasive blasting apparatus comprising such a control system.

BACKGROUND

Abrasive blasting is a well-known technique with many applications including cleaning metal surfaces such as boat hulls. In abrasive blasting, a flow of compressed air is used to entrain blast media such as sand, grit or glass beads. The high-pressure air/media mixture is then fed down a blast hose and out of a blast nozzle that directs the mixture onto the surface to be cleaned.

To enable a user to safely control abrasive blasting apparatus, a deadman's switch is usually mounted to the blast nozzle. When actuated by a user the switch causes the abrasive blasting apparatus to deliver compressed air and blast media via the nozzle. On release, the flow of both compressed air and blast media is stopped.

It has been found that when the deadman's switch is actuated again blast media in the blast hose tends to aggregate, resulting in a slug of blast media being ejected from the blast nozzle.

This is undesirable. When the slug exits the nozzle it can cause the user to lose control of the nozzle due to the force of the slug. In addition, the slug has a high risk of damaging or harming anything or any person which it impacts.

It is an object of embodiments of the present invention to provide a control system for an abrasive blasting apparatus that at least partially overcomes or alleviates the above problem.

SUMMARY

According to a first aspect of the present invention there is provided a control system for controlling abrasive blasting apparatus, the control system being arranged to control delivery of air and blast media to a blast nozzle of the abrasive blasting apparatus, the control system comprising a deadman's switch, the deadman's switch comprising a user operable control, the user operable control being operable from a first position to a second position, wherein: in the first position the control system does not cause the abrasive blasting apparatus to deliver air or blast media to the blast nozzle; in the second position the control system causes the abrasive blasting apparatus to deliver both air and blast media to the blast nozzle; and in an intermediate position between the first and second positions the control system causes the abrasive blasting apparatus to deliver air but not blast media to the blast nozzle.

The control system reduces the frequency and severity of blast media slugs forming in the abrasive blasting apparatus when blasting. The applicant has realised that blast media slugs form through two mechanisms.

Firstly, when the supply of compressed air and blast media to a blast hose are commenced together there is initially insufficient airflow to carry the blast media along the hose. This leads to accumulation of blast media, forming a slug. By providing a deadman's handle with an intermediate position in which it causes abrasive blasting apparatus to deliver compressed air, but not blast media, the invention controls the abrasive blasting apparatus so that supply of compressed air can be established before introduction of blast media and compressed air continues to flow for a period after the supply of blast media ceases when the apparatus is stopped. This helps ensure that a good flow of compressed air is established before introduction of blast media, reducing the risk of slug formation.

Secondly, when the supply of compressed air and blast media to a hose are stopped together some blast media remains in the hose. When air and blast media is reintroduced this tends to sweep up the residual blast media, forming or enlarging a slug. The invention permits a flow of compressed air to continue after the introduction of blast media stops. This helps to flush blast media remaining in the blast hose from the hose when the blasting apparatus is stopped, further reducing the risk of slug formation when the apparatus is reactivated.

The first position of the user operable control may be a range of positions. When the user operable control is within the range of positions defining the first position, the control system may not cause the abrasive blasting apparatus to deliver air or blast media to the blast nozzle.

The second position of the user operable control may be a range of positions. When the user operable control is within the range of positions defining the second position, the control system may cause the abrasive blasting apparatus to deliver both air and blast media to the blast nozzle.

The intermediate position of the user operable control may be a range of positions. When the user operable control is within the range of positions defining the intermediate position, the control system may cause the abrasive blasting apparatus to deliver air but not blast media to the blast nozzle.

The user operable control may be operable over a range of positions. The first position of the user operable control may be defined from a first end of the range to a first switching point. The intermediate position of the user operable control may be defined from the first switching point to a second switching point. The second position of the user operable control may be defined from the second switching point to a second end of the range. The first, intermediate and second positions can therefore be defined by a range of the possible positions of the user operable control. This increases ease of use of the control system by the operator.

The deadman's switch may comprise first and/or second control elements. The user operable control may be arranged to sequentially change the state of the first and second control elements. The user operable control may sequentially change the state of the first and second control elements as it is moved between the first and second positions. The user operable control may be arranged to change the state of the first control element when moved between the first position and the intermediate position. The user operable control may be arranged to change the state of the second control element when moved between the second position and the intermediate position.

The first and/or second control element may be monostable. The first control element may comprise an electrical switch. The first control element may comprise a pneumatic valve. The second control element may comprise an electrical switch. The second control element may comprise a pneumatic valve. An electrical switch or pneumatic valve may be of a normally open or normally closed type.

The first control element may be intended to control delivery of compressed air. The second control element may be intended to control delivery of blast media. The second control element may only permit the delivery of blast media if the first control element permits the delivery of compressed air. This ensures that blast media is not delivered without compressed air, which could cause a blockage in the abrasive blasting apparatus.

The deadman's switch can be flexibly designed with control elements to provide intuitive and simple control of the abrasive blasting apparatus. This can ensure that even an inexperienced user always achieves the benefits of the control system and does not inadvertently generate slugs of blast media in the abrasive blasting apparatus.

The user operable control may comprise a lever. The user operable control may be biased towards the first position. A spring may bias the user operable control. The user operable control may comprise an interlocking lever. The interlocking lever may be moveable from a first position to a second position, via an intermediate position. The interlocking lever may be biased towards the first position. The interlocking lever may comprise a slot through which the lever projects. The slot may comprise an edge, bar or roller on which the lever rests. The roller may rotate. The lever and interlocking lever may move together. Movement of the lever and interlocking lever may be coupled. When in its first position, the interlocking lever may prevent movement of the user operable control from its first position to its intermediate and/or second positions.

The control system may comprise a detent. The detent may prevent movement of the user operable control until released or overcome. The detent may prevent movement of the user operable control from the intermediate position to the second position. The detent may be provided by a stop against which the lever can bear. The stop may resist the movement of the user operable control to its second position until a threshold force is exceeded. The stop may be biased to urge the user operable control out of its second position. The stop may be a cam.

When the user operable control is moved from its first position to its intermediate position, the lever may change the state of the first control element. When the user operable control is moved from its intermediate position to its second position, the interlocking lever may change the state of the second control element.

Advantageously, the control system ensures the abrasive blasting apparatus does not deliver air and/or blast media due to inadvertent movement of the user operable control. This ensures the blasting apparatus is safe and does not deliver blast media and/or air in the event of user incapacitation or if the user loses control of the user operable control.

The control system may be operable to control the flow rate of blast media delivered by the abrasive blasting apparatus when the user operable control is in the second position. The control system may be operable to vary the flow rate of blast media while blast media is being delivered. The deadman's switch may comprise a second user operable control. The second user operable control may be operable to vary the flow rate of blast media that is delivered. The second user operable control may comprise one or more control elements. One or more control element may be operable to increase or decrease the flow rate of blast media. In some embodiments, the second user operable control may comprise two buttons, in others a single control element which may be urged against a bias towards increase and decrease positions, from a neutral position. The control may be a thumb-wheel or rocker switch. In response to actuation of the control, the system may increase or decrease the flow rate of blast media. In some embodiments, the second user operable control may comprise: an increment button and a decrement button. In response to actuation of the increment button the control system may increase the flow rate of blast media. In response to actuation of the decrement button the control system may decrease the flow rate of blast media. The flow rate may be expressed as a percentage of the maximum possible flow rate. The range of accessible flow rates may be from no flow of blast media (0%) to a maximum possible flow rate (100%). In some embodiments, the range of accessible flow rates may be from a minimum, non-zero flow rate (>0%) to a maximum possible flow rate (100%).

The second user operable control may comprise a boost button. Actuation of the boost button may cause the control system to increase the flow rate of blast media temporarily. Actuation of the boost button may cause the control system to increase the flow rate of blast media while the boost button is actuated.

The user may thus change the flow rate of blast media delivered by the abrasive blasting apparatus before, during or after blasting. This is extremely beneficial as the blasting demands during a particular job can vary depending on the extent of rust or dirt that must be cleaned from a surface, or the degree of treatment a surface requires. The ability to modulate the flow of blast media increases the efficiency and quality of the work completed by the user. The ability to modulate the flow of blast media from the deadman's handle avoids the need for a second operative to be employed to modulate the flow of blast media.

The second user operable control may comprise a choke button. Actuation of the choke button may cause the control system to temporarily increase the pressure urging the blast media to flow through a blast media valve of the abrasive blasting equipment, such as by increasing the pressure at an inlet of the valve and/or decreasing the pressure at an outlet of the valve. Advantageously, this allows the user to clear the abrasive blasting apparatus of blast media blockages without assistance. This is typically a task that must be completed by a second user under the instruction of the first user. This is unsafe as communication is inhibited in the harsh blasting environment and as the user holding the blast nozzle has no direct control of the changes in pressure. The choke button provides direct control for the user of such pressure changes and therefore, the present invention allows the operator to perform abrasive blasting and clear blockages in the apparatus in a safer and more effective manner.

The deadman's switch may comprise an output means. The output means may provide information about any one or more of the following: whether the abrasive blasting apparatus is delivering air to a blast nozzle of the abrasive blasting apparatus; whether the abrasive blasting apparatus is delivering blast media to the blast nozzle; the input air pressure delivered to the abrasive blasting apparatus; the air pressure in a blast media hopper of the abrasive blasting apparatus; the amount of blast media in the blast media hopper; the set flow rate of blast media through a blast media valve; errors or alarms in the abrasive blasting apparatus; or the like. The output means may provide alarms to the user. The output means may notify the user of a fire alarm. The output means may comprise one or more indicator lamps. The indicator lamps may be light emitting diodes. The output means may comprise a display. The display may be provided in a head-up display unit within a user's personal protective equipment. The output means may be a speaker. The output means may be headphones. The output means may facilitate communication with other people in the work area.

There are many different factors that affect the performance of the abrasive blasting apparatus. The addition of an output means helps the user to safely and efficiently operate the equipment through access to key statistics and information about the current performance of the blasting apparatus. In addition, abrasive blasting is a loud, dangerous activity and as such extensive personal protective equipment is needed to safely operate abrasive blasting apparatus. This can lead the user to be unaware of their surroundings. External information can be fed to the user through the output means so that they can react appropriately to changes in their surrounding environment, such as a fire alarm or a co-worker who needs access to their work site.

The control system may be arranged to communicate with the abrasive blasting apparatus via an electrical connection. The control system may be arranged to communicate with the abrasive blasting apparatus via a pneumatic connection. In some embodiments, the control system may be arranged to communicate with the abrasive blasting apparatus via an electrical connection and a pneumatic connection. In such embodiments, electric switches may be used for the first and second control elements. The electric switches may communicate with electrically actuated pneumatic valves via an electrical connection. The pneumatic valves may communicate with the abrasive blasting apparatus via pneumatic connections. The first and/or second user operable controls may use separate or integrated communication connections to the abrasive blasting apparatus. Additionally or alternatively, wireless communications links may be used. Thus, the control system can be flexibly designed to suit the needs of the abrasive blasting apparatus to be controlled.

According to a second aspect of the present invention there is provided an abrasive blasting apparatus comprising a control system according to the first aspect of the present invention. The abrasive blasting apparatus may further comprise any one or more of: an air control valve; a blast media valve; and a blast hose. The control system may be configured to control the air control valve. The air control valve may permit or prevent air to flow into a blast hose. The control system may be configured to control the blast media valve. The blast media valve may permit or prevent blast media to flow into the blast hose. The first control element of the deadman's switch may be operably connected to the air control valve. The second control element of the deadman's switch may be operably connected to the blast media valve. The abrasive blasting apparatus may further comprise a blast nozzle. The deadman's switch may be on the blast nozzle or on the blast hose adjacent the blast nozzle. The abrasive blasting apparatus may further comprise a choke valve. The control system may be configured to control the choke valve to increase the pressure difference urging blast media through the blast media valve. The choke button may be connected to the choke valve.

The abrasive blasting apparatus according to the second aspect of the present invention may incorporate any one or more features of the first aspect of the present invention as desired or required.

The abrasive blasting apparatus according to the second aspect of the present invention advantageously reduces the frequency and severity of the formation of slugs in the abrasive blasting apparatus. The control system ensures safe and efficient operation of the abrasive blasting apparatus through convenient and intuitive user control without the necessity for a second operator to be present.

BRIEF DESCRIPTION OF THE DRAWINGS

In order that the invention may be more clearly understood one or more embodiments thereof will now be described, by way of example only, with reference to the accompanying drawings, of which.

DETAILED DESCRIPTION

Figure 1:
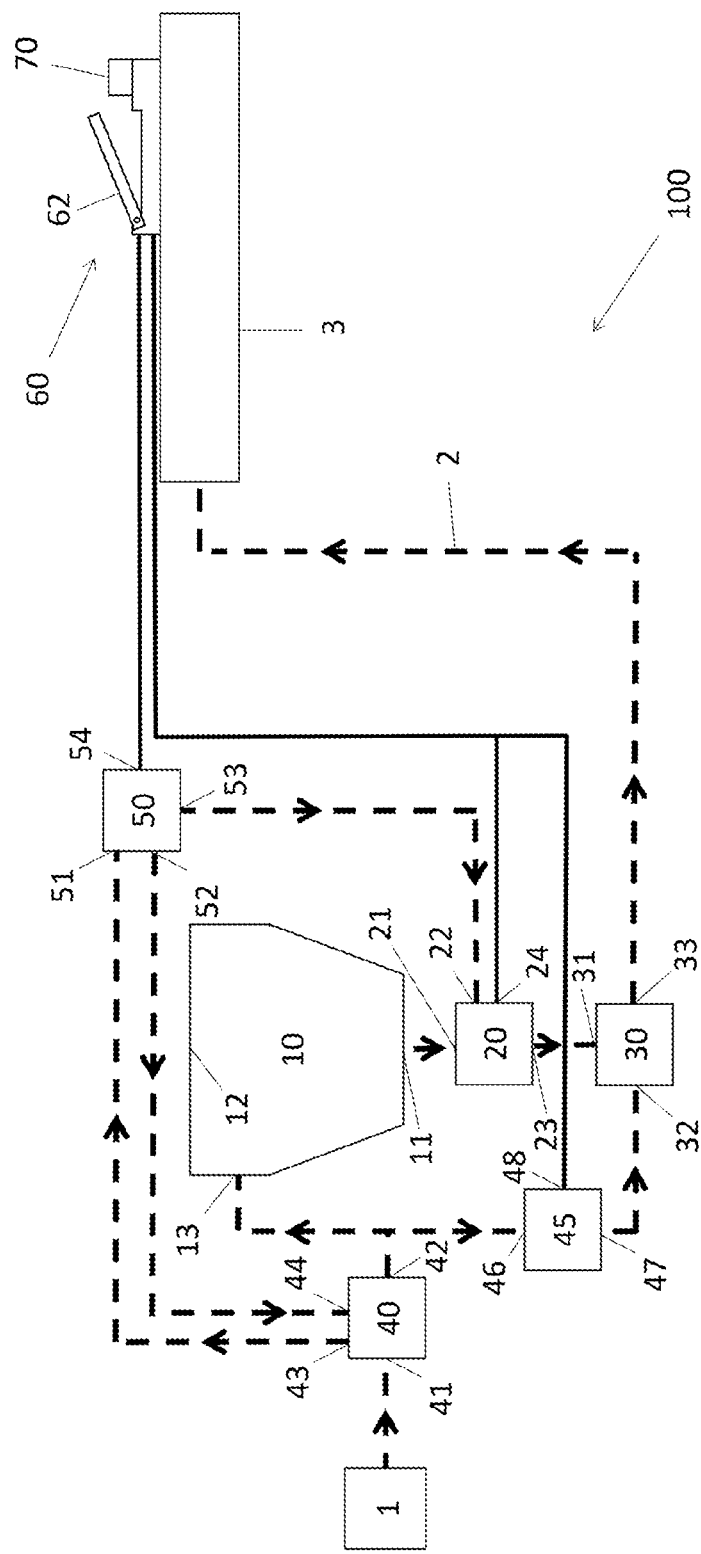
FIG. 1 is a schematic view of an abrasive blasting apparatus.

In FIG. 1, fluid connections between the components are shown as dashed lines and electrical connections are shown as solid lines. Arrows on the dashed lines correspond to the direction of flow when blasting.

Referring to FIG. 1, abrasive blasting apparatus 100 comprises a blast media hopper 10, a blast media valve (BMV) 20, a mixer 30, an air control valve (ACV) 40, and a choke valve 45. The blast media hopper 10 has an upper cylindrical section and a lower frustro-conical section, where the radius of the frustro-conical section is smallest at its base. In the base of the blast media hopper 10 there is a media outlet 11 and in the top of the blast media hopper 10 a media inlet 12 in which is disposed a pop-up valve (not shown). The pop-up valve is normally open allowing blast media to be introduced into the blast media hopper 10 via the blast media inlet 12. In use, when the blast media hopper 10 is pressurised, the pop-up valve closes allowing the hopper to further pressurise.

The blast media hopper 10 also has an air inlet 13 in the side-wall of the upper cylindrical section.

The blast media hopper 10 media outlet 11 is fluidly connected to a media inlet 21 in the top of the BMV 20 which is positioned directly below the base of the blast media hopper 10. Along with an inlet 21, the BMV 20 also has a control inlet 22 and an outlet 23. Air pressure applied at the control inlet 22 causes the BMV 20 to control the flow of blast media through the BMV 20 from the inlet 21 to the outlet 23. The inlet 21 and outlet 23 are disposed on the top and bottom of the BMV 20 respectively. The BMV 20 also has a control input 24.

The BMV outlet 23 is fluidly connected to a media inlet 31 in the top of the mixer 30 which is positioned directly below the BMV outlet 23. Along with a media inlet 31, the mixer 30 also has an air inlet 32, and an outlet 33. The air inlet 32 and outlet 33 are disposed on opposite sides of the mixer 30 respectively, and the media inlet 31 is disposed on the top of the mixer 30. In use, when blasting, compressed air and blast media enter the mixer 30 simultaneously via the air and media inlets 32, 31. The blast media is entrained in the compressed air and the air-media mixture flows out of the outlet 33.

A blast hose 2 is connected to the mixer outlet 33 and fluidly connects the mixer outlet 33 to a blast nozzle 3. The blast hose 2 may be several metres in length and allows the user to access various locations for blasting without moving the abrasive blasting apparatus 100. During blasting, the air-media mixture flows through the blast hose 2, into the blast nozzle 3 and out of an outlet at the free end of the blast nozzle 3. The blast nozzle 3 is fitted with a deadman's switch 60, described further below.

Returning to the ACV 40, the ACV 40 is attached to the outside of the blast media hopper 10. The ACV 40 has an inlet 41, an outlet 42, a control outlet 43, and a control inlet 44. The inlet 41 is, in use, connected to an external compressed air supply 1. Outlet 42 is fluidly connected in parallel to the blast media hopper air inlet 13 and to an inlet 46 on the choke valve 45. Air pressure applied at the control inlet 44 causes the ACV 40 to control the flow of air through the ACV 40 from the inlet 41 to the outlet 42.

Turning now to the choke valve 45, the choke valve 45 is attached to the outside of the blast media hopper 10 and has an inlet 46, an outlet 47 and a control input 48. The outlet 47 is fluidly connected to the air inlet 32 of the mixer 30.

Turning now to the valve assembly 50, the valve assembly is mounted onto the blast media hopper 10 but is shown separately for clarity (and in other embodiments could be provided separately to the blast media hopper 10). The valve assembly 50 has an inlet 51, air and media control outlets 52, 53, and a control input 54. The inlet 51 is fluidly connected to the ACV control outlet 43, although the connection is shown as a single line, the connection is two parallel connections associated with the air and media control outlets 52, 53 respectively. This aids in the function of the valve assembly 50 as described later. The valve assembly air control outlet 52 is fluidly connected to the ACV control inlet 44, and the media control outlet 53 is fluidly connected to the BMV control inlet 22. The control input 54 is electrically connected to the deadman's switch 60 by electric cables and connectors.

Referring now to FIGS. 2, 3, 4 and 5, the deadman's switch 60 comprises an elongate, cuboidal base 61 which supports the other components of the deadman's switch 60, including first and second 70 user operable controls, and facilitates securing the deadman's switch 60 to the blast nozzle 3.

Figure 2:
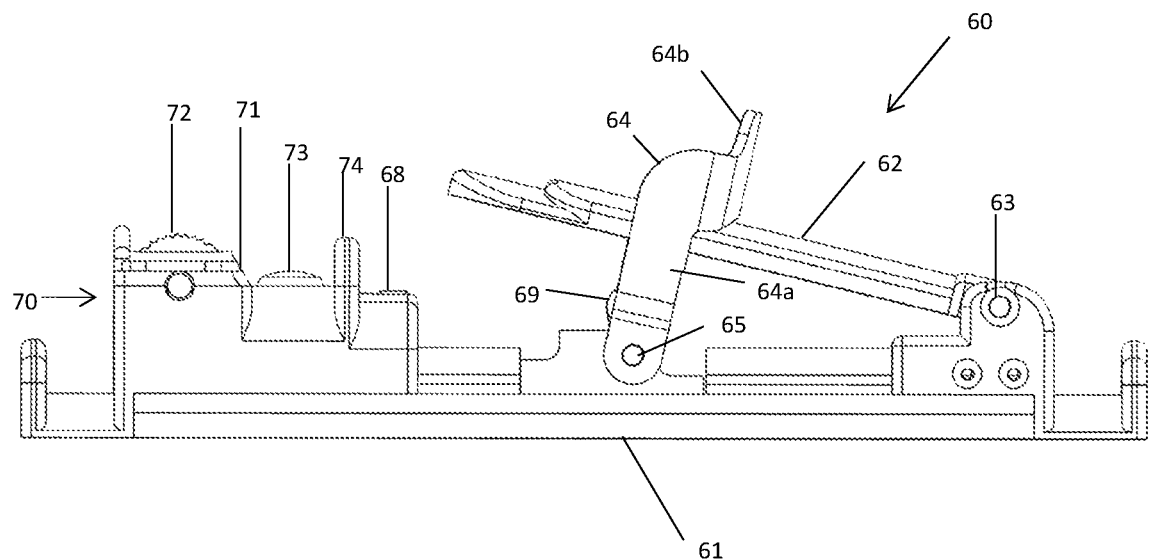
FIG. 2 is a side view of a deadman's switch of the apparatus of FIG. 1 in a first state.
Figure 5:
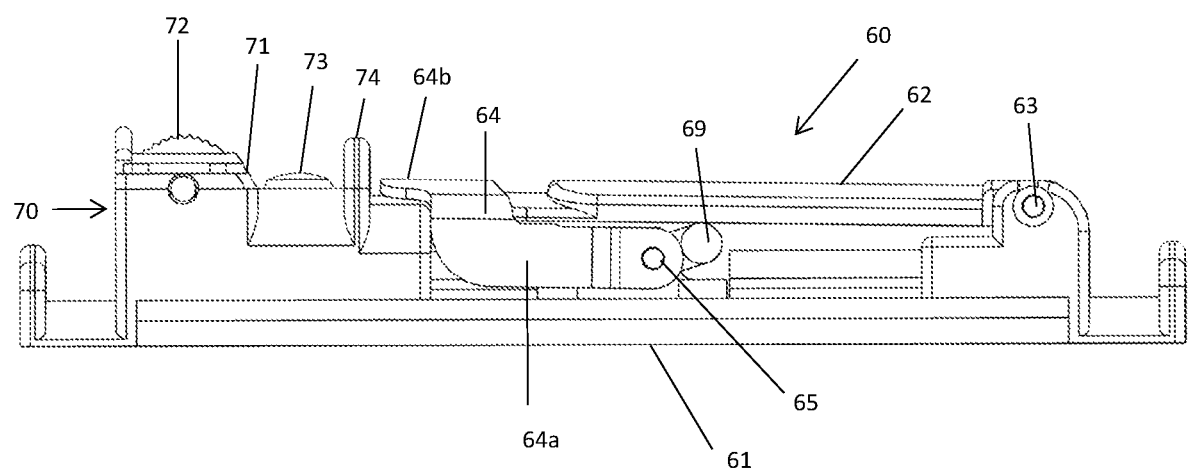
FIG. 5 corresponds to FIG. 2 with the deadman's switch in a second state.

The first user operable control comprises an elongate main lever 62 pivotally attached to the end of the base 61 remote from the nozzle air/media outlet by a first hinge 63, which is disposed at a first end of the main lever 62. The first hinge 63 allows the lever 62 to be operable from a first position in which the main lever 62 extends away from the base 61, as shown in FIG. 2, to a second position where the main lever 62 is substantially parallel to the base 61 as shown in FIG. 5. A resilient member (not shown), such as a spring, is arranged to resiliently bias the main lever 62 towards the first position.

Close to the free end of the main lever 62 distal the first hinge 65, the main lever 62 has a stepped profile. The upper surface of the main lever 62 steps down near the tip and as such, the tip is thinner than the rest of the main lever 62.

The deadman's switch 60 also comprises an interlocking lever 64 pivotally attached to the base by a second hinge 65 disposed near the mid-point of the long axis of the base 61. The second hinge 65 allows the interlocking lever 64 to be operable from a first position in which the interlocking lever 64 extends substantially vertically away from the base 61, as shown in FIG. 2, to a second position where the top of the interlocking lever 64 is substantially parallel to the base 61 as shown in FIG. 5. A resilient member (not shown), such as a spring, is arranged to resiliently bias the interlocking lever 64 towards the first position.

The pivot axes of both the first 63 and second 65 hinges are parallel to the width axis of the base 61.

The interlocking lever 64 is connected to the second hinge 65 by two elongate rectangular arms 64a that extend perpendicular to the axis of the second hinge 65, one at either end of the hinge. At the second hinge, the arms 64a are separated by a distance narrower than the width of the main lever 62. Adjacent the second hinge 65, the arms 64a step away from the base 61 in a direction parallel to the axis of the second hinge 65. After the step, the separation distance between the arms 64a is slightly wider than the width of the main lever 62.

The interlocking lever 64 also comprises a rectangular plate 64b connected to the upper edge of each arm distal the second hinge 65, the upper edge being substantially parallel to the base 61 when the interlocking lever 64 is in its second position. The plate 64b spans the upper edge of the arms 64a from a point approximately two-thirds along their length from the second hinge 65 to their ends. The plate 64b also extends a short distance beyond the end of the arms 64a.

A roller 66 spans between the arms 64a at approximately their mid-point and, with the plate 64b, defines a slot through which the main lever 62 projects. The movement of the main 62 and interlocking 64 levers is therefore coupled and one cannot be moved between their respective first and second positions without also moving the other to its respective first/second position. This is manifested in that, as the main 62 and interlocking 64 levers move from their first positions toward their second positions, the main lever 62 slides through the slot defined by the roller 66, arms 64a and plate 64b of the interlocking lever 64.

Figure 3:
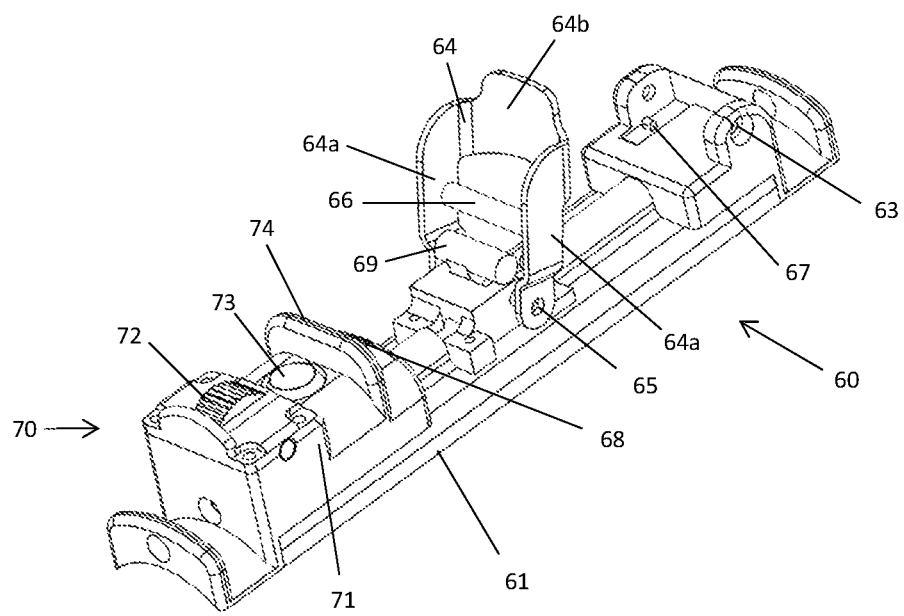
FIG. 3 is a perspective view of the deadman's switch of FIG. 2 with the main lever not shown.

As shown in FIG. 3, a cam 69 is pivotally connected to the base by the second hinge 65. The main body of the cam 69 is cylindrical and is disposed between the arms 64a of the interlocking lever 64. The body of the cam 69 is connected to the second hinge 65 by a short arm.

Figure 4:
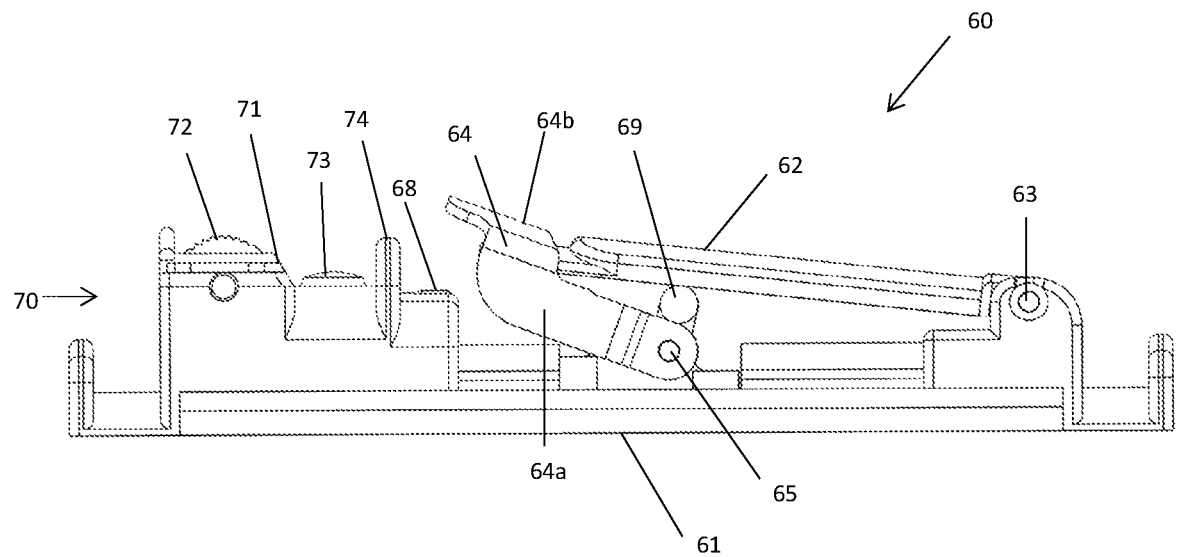
FIG. 4 corresponds to FIG. 2 with the deadman's switch in an intermediate state.

The second hinge 65 allows the cam 69 to be operable from a first position, in which the cam 69 is above the second hinge 65 as shown in FIGS. 2, 3 and 4, to a second position where the cam 69 is positioned on the same side of the second hinge 65 as the first hinge 63, as shown in FIG. 5. As such, the cam 69 rotates in the opposite direction to both levers 62, 64 when moving between the first and second positions respectively. A resilient member (not shown), such as a spring, is arranged to resiliently bias the cam 69 towards the first position. The cam 69 is sized such that the underside of the main lever 62 does not contact the cam 69 when the main lever and the cam are in their first positions, but the underside contacts the cam 69 when the main lever 62 is in an intermediate position between the first and second positions and the cam 69 is in its first position.

As shown in FIG. 3, a button of a normally open first electrical switch 67 is mounted on the base 61 under the first hinge 63. In the first position, the main lever 62 (not shown in FIG. 3) does not contact the switch 67. When the main lever 62 moves to the intermediate position from first position, the main lever 62 depresses the button closing the switch 67 against a resilient bias. When a user moves the main lever 62 to its second position, the main lever 62 continues to depress the button and the first electrical switch 67 remains closed.

A button of a normally open second electrical switch 68 is mounted on the base 61 at a position slightly beyond the second end of the main lever 62 when the main lever 62 is in its second position.

To move the levers 62, 64 towards their second positions the cam 69 must be moved against its resilient bias, providing a detent for the user at the intermediate position.

When both levers 62, 64 and the cam 69 are in their second positions, the plate 64b of the interlocking lever 64 extends over the tip of the main lever 62. In this position, it contacts and depresses the button of the second electrical switch 68, closing the switch 68. In addition, the upper edge of the main lever 62 and plate 64*b* are substantially aligned and parallel to the elongate axis of the base 61.

The second user operable control 70 comprises a housing 71 mounted on the base 61 adjacent the second electrical switch 68, away from the main lever 62. The housing 71 comprises a media adjuster 72 and a button of a normally open third electrical switch 73, both on the top of the housing 71. The adjuster 72 and third switch 73 are separated from the second switch 68 by an upstanding rectangular wall 74 that protrudes from the top of the housing 71. The second electrical switch 68, wall 74, third switch 73 and media adjuster 72 are all disposed adjacent one another along the elongate axis of the base 71. The wall 74 provides a barrier to prevent inadvertent use of the third switch 73 or adjuster 72 by the user. The housing 71 is stepped so that the button of the third switch 73 is disposed at a lower height above the base than the adjuster 72. This allows the user to access the adjuster 72 without accidentally depressing the button of the switch 73. In this embodiment, the media adjuster 72 is a thumb-wheel switch.

The first and second electrical switches 67, 68 are both electrically connected to the valve assembly control input 54. The third electrical switch 73 and media adjuster 72 are electrically connected to the choke valve control input 48 and BMV control input 24 respectively.

The valve assembly 50 is arranged to permit air to flow from the inlet 51 to the air control outlet 52 when the first electrical switch 67 is closed, and to prevent air flowing from the inlet 51 to the air control outlet 52 when the first electrical switch 67 is open.

The valve assembly 50 is also arranged to permit air to flow from the inlet 51 to the media control outlet 53 when both the first 67 and second 68 electrical switches are closed. In addition, the valve assembly 50 is arranged to prevent air flowing from the inlet 51 to the media control outlet 53 when either the first 67 or second 68 electrical switches are open.

Returning to the ACV 40, the ACV 40 is arranged to permit air to flow from the inlet 41 to the control outlet 43. It is also arranged to permit air to flow from the inlet 41 to the outlet 42 if a threshold pressure is exceeded at the control inlet 44, and to prevent air flowing from the inlet 41 to the outlet 42 if the threshold pressure is not exceeded.

The BMV 20 is arranged to perform two functions. Firstly, the BMV 20 permits media to flow from the inlet 21 to the outlet 23 if a threshold pressure is exceeded at the air control inlet 23, and prevents media flowing from the inlet 22 to the outlet 23 if the threshold pressure is not exceeded. Secondly, the BMV 20 is arranged to increase or decrease the flow rate of media in response to commands from the media adjuster 72. The BMV 20 comprises a stepper motor (not shown) that is arranged to increase or decrease the flow rate of media.

The choke valve 45 is arranged to permit air to flow from the inlet 46 to the outlet 47 when the third switch 73 of the second user operable control 70 is open, and to prevent air flowing from the inlet 46 to the outlet 47 when the third switch 73 is closed.

In some embodiments, a display (not shown) is mounted on, or near, the deadman's switch 40 and informs the user of the current selected flow rate of blast media and possibly other things.

In use, an external compressed air supply 1 is connected to the ACV air inlet 41 and an electrical power supply (not shown) provided to the electrical control equipment. Typically, the main lever 62, interlocking lever 64 and cam 69 of the deadman's switch 60 are initially in their first positions. In this state the first switch 67 and second switch 68 are open, consequently the valve assembly 50 does not permit any flow of compressed air. As such, the threshold pressure is not exceeded at both the ACV and BMV control inlets 44, 22. Therefore, the ACV 40 does not permit air to flow and the BMV 20 does not permit media to flow.

In this state, a user can alter the flow rate of blast media that will be delivered by the abrasive blasting equipment 100 when activated by using the media adjuster 72. Additionally, the pop-up valve in the blast media hopper media inlet 12 will open and blast media can be introduced via the media inlet 12 until the blast media hopper 10 is sufficiently full.

To commence blasting, a user moves the main 62 and interlocking 64 levers from their first position towards their second position. As the main lever 62 contacts the cam 69 and reaches its intermediate position, the main lever 62 depresses the button of the first switch 67.

The depression of the button closes the first switch 47 and this causes the valve assembly 50 to permit compressed air to flow from the inlet 51 to the air control outlet 52. The flow of compressed air causes the air pressure at the ACV control inlet 44 to exceed the threshold pressure. Consequently, the ACV 40 permits compressed air to flow from the inlet 41 to the outlet 42. Air flows from ACV outlet 42 into the blast media hopper 10 via the air inlet 13 and to the inlet 46 of the choke valve 45. The air flow pressurises the blast media hopper 10 such that the pop-up valve closes. This prevents air escaping from the blast media hopper 10, and prevents additional blast media entering the blast media hopper 10 through the media inlet 12, allowing further pressurisation of the blast media hopper and a corresponding increase in air pressure provided to the choke valve inlet 46.

In this state, the third electrical switch 73 is in its normally open state, as such, the choke valve 45 permits air to flow from the inlet 46 to the outlet 47. The air then proceeds to flow through the mixer 30, through the blast hose 2, and out of the blast nozzle 3.

Should the user wish the apparatus to remain in this state, the user can rest the main lever 62 against the detent provided by the cam 69.

To deliver blast media to the blast nozzle 3, the user moves the main 62 and interlocking 64 levers into their second positions by urging the main lever 62 against the detent provided by the cam 69. Once the main lever 62, interlocking lever 64 and cam 69 are all in their second positions, the end of the interlocking lever 64 presses against the second switch 68 to close it. This causes the valve assembly 50 to permit compressed air to flow from the inlet 51 to the media control outlet 53. The flow of compressed air causes the air pressure at the BMV control inlet 22 to exceed the threshold pressure. Consequently, BMV 20 permits blast media to flow from the inlet 21 to the outlet 23. The blast media then enters the mixer 30 through the mixer inlet 31 and is entrained in the air flow before exiting the mixer 30 through the outlet 33 with the air. Thus, when the main lever 62 is in its second position, the abrasive blasting apparatus 100 delivers air and blast media to the blast nozzle 3.

In the embodiment shown in FIGS. 2, 4 and 5, the deadman's switch is in the first, intermediate or second states when the main lever 62 is in the first, intermediate or second positions respectively. In these embodiments, each position of the first user operable control is defined as a continuous range of possible positions. The transition between the first and intermediate positions, and intermediate and second positions are defined by first and second switching points respectively. In the embodiments shown, the first switching point is defined as when the main lever 62 is adjacent but not in contact with the cam 69. The second switching point is defined when the main lever 62 has moved to allow the interlocking lever 64 to just depress the button of the second switch 68. Thus, the first and intermediate positions comprise a relatively large range of possible positions of the main lever 62 whereas the second position comprises a small range.

During operation the user may use the second user operable control 70 to vary the blast media flow rate through the BMV 20. This allows the user to vary the flow rate of blast media in response to the changing demands of their work without deactivating the abrasive blasting apparatus 100.

During operation, the user may experience blockages of blast media forming between the blast media hopper 10 and mixer 30. The user may clear these blockages by using the third switch 73 of the second user operable control 70 to temporarily close the choke valve 45. If the user closes the third switch 73 by depressing the associated button, the choke valve 45 prevents the flow of air from its inlet 46 to its outlet 47. This causes a pressure or increased pressure differential between the blast media hopper 10 and the mixer 30. The pressure difference causes blockages of blast media to displace and clear through the mixer 30, blast hose 2 and nozzle 3. The second user operable control therefore affords the user with convenient, safe means for clearing such blockages without the assistance of additional users.

If the user (intentionally or not) releases the main lever 62 of the deadman's switch 60, the main 62 and interlocking 64 levers and cam 69 move towards their first positions under their respective resilient biases. This initially opens the second switch 68 causing the BMV 20 to prevent flow of blast media into the compressed air stream in the mixer 30. Air continues to flow via the mixer 30 to the blast nozzle 3 and this purges the blast hose 2 and nozzle 3 of remaining blast media. The lever 62 subsequently releases the first switch 67, causing the ACV 40 to prevent the flow of compressed air through outlet 42.

Both the first 67, second 68 and third 73 switches are described as normally open switches. It will be appreciated, however, that the apparatus could be configured to function if any one or more of the switches are of a normally closed type.

The arrangement of the deadman's switch 60 is such that the abrasive blasting apparatus 100 always delivers a flow of compressed air to the blast hose 2 prior to delivering blast media, and always stops delivering blast media prior to stopping the flow of compressed air. This eliminates (or at least substantially reduces) formation and delivery of slugs of blast media because remaining blast media is purged from the blast hose 2 at the end of a blasting operation and blast media is not admitted to the hose 2 until compressed air is flowing through the hose 2.

The cam 69 helps to prevent inadvertent operation of the blasting apparatus 100. This is advantageous where a user wishes only to use compressed air, such as when cleaning a surface of residual blast media, or wishes to deliver compressed air for a prolonged period to ensure clearing of the blast hose 2 prior to delivery of blast media.

The second user operable control 70 enables the quantity of blast media delivered by the apparatus to be adjusted at any time.

In this embodiment the abrasive blasting apparatus 100 is controlled by the deadman's switch 60 via a combination electrical and pneumatic connections. However, these could also be any other suitable control means. For example, embodiments of the invention could use pneumatic control and the first 67 and second 68 switches would be replaced with valves. Alternatively, an electronic embodiment could be implemented in which the first 67 and second 68 switches control the ACV 40 and BMV 20 directly.

In some embodiments, the mixer 30 may also be arranged to control the flow rate of air from the air inlet 32 to the outlet 33. This can afford additional flexibility and convenience to the user whilst blasting.

Figure 6:
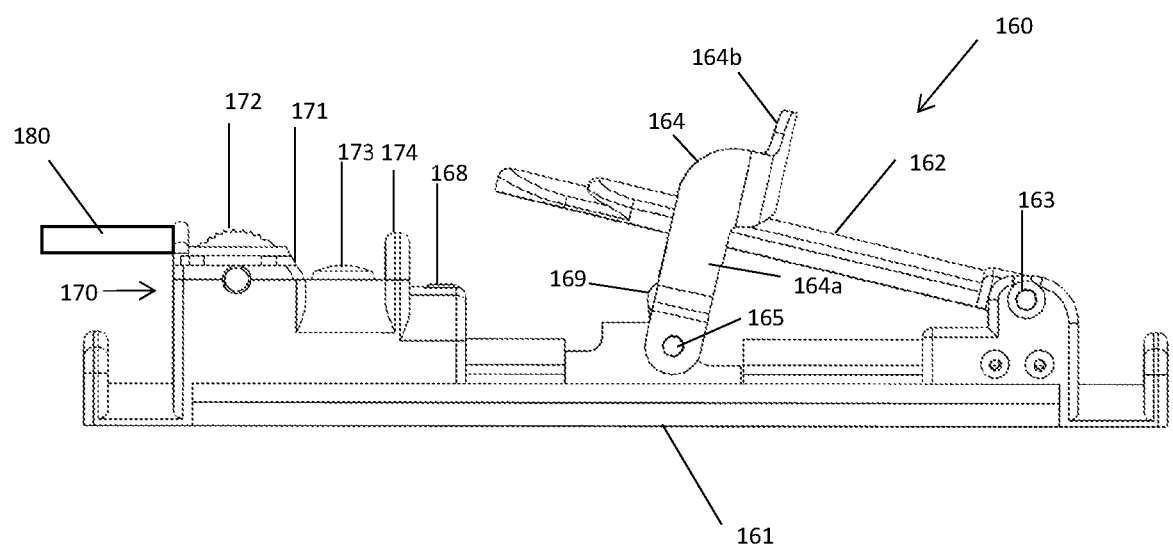
FIG. 6 is a side view of a second embodiment of the deadman's switch.

Referring to FIG. 6, a second embodiment of a deadman's switch 160 operates in the same way and has similar features to the deadman's switch 60 described above and shown in FIGS. 2-5. As such, like numerals are used to denote the same or equivalent features. The main difference being that the second embodiment of the deadman's switch 160 comprises an output means 180, which in the embodiment shown is attached to a top corner of the housing 171 of the second user operable control 170, distal the second electrical switch 168. In this embodiment, the output means includes a display configured to provide alarms to the user, such as visual and/or audible alarms. For example, an alarm may be generated depending on the air pressure in a blast media hopper of the abrasive blasting apparatus, or may be generated to notify the user of a fire alarm. For example, the output means 180 may provide an alarm in the form of a flashing light or color on the display. This can be particularly useful as abrasive blasting is a loud activity which can lead the user to be unaware of their surroundings.

The one or more embodiments are described above by way of example only. Many variations are possible without departing from the scope of protection afforded by the appended claims.

The invention claimed is:

1. A control system for controlling an abrasive blasting apparatus, the control system being arranged to control delivery of air and blast media to a blast nozzle of the abrasive blasting apparatus, the control system comprising a deadman's switch, the deadman's switch comprising a user operable control, the user operable control being operable from a first position to a second position, wherein: in the first position the control system does not cause the abrasive blasting apparatus to deliver air or blast media to the blast nozzle; in the second position the control system causes the abrasive blasting apparatus to deliver both air and blast media to the blast nozzle; and in an intermediate position of the user operable control, the control system causes the abrasive blasting apparatus to deliver air but not blast media to the blast nozzle, wherein the intermediate position is provided between the first position and second position such that the user operable control passes through the intermediate position when the user operable control is operated from the first position to the second position and when the user operable control is operated from the second position to the first position such that air but not blast media is delivered to the blast nozzle when the user operable control passes through the intermediate position.

2. The control system as claimed in claim 1 wherein the deadman's switch comprises first and second control elements and the user operable control is arranged to sequentially change the state of the first and second control elements as it is moved between the first and second positions.

3. The control system as claimed in claim 2 where the first and/or second control element is of a monostable type.

4. The control system as claimed in claim 2 wherein the first and/or second control element comprises an electrical switch.

5. The control system as claimed in claim 2 wherein the first and/or second control element comprises a pneumatic valve.

6. The control system as claimed in claim 2 wherein the first control element is configured to control delivery of compressed air to the blast nozzle, and wherein the second control element is configured to control delivery of blast media to the blast nozzle.

7. The control system as claimed in claim 1 wherein the user operable control comprises a lever.

8. The control system as claimed in claim 7 wherein the user operable control further comprises an interlocking lever.

9. The control system as claimed in claim 8 wherein a movement of the lever and interlocking lever is coupled.

10. The control system as claimed in claim 1 comprising a detent which, until released or overcome, prevents movement of the user operable control from the intermediate position to the second position.

11. The control system as claimed in claim 10 wherein the detent is provided by a stop against which the user operable control can bear.

12. The control system as claimed in claim 1 wherein the deadman's switch further comprises a second user operable control, the second user operable control being operable to vary a flow rate of blast media that is delivered.

13. The control system as claimed in claim 12 wherein the flow rate can be varied while abrasive blast media is being delivered.

14. The control system as claimed in claim 1 wherein the deadman's switch further comprises an output configured to provide an alarm to the user.

15. The control system as claimed in claim 1 wherein the control system is arranged to communicate with the abrasive blasting apparatus via an electrical connection.

16. The control system as claimed in claim 1 wherein the control system is arranged to communicate with the abrasive blasting apparatus via a pneumatic connection.

17. An abrasive blasting apparatus comprising the control system as claimed in claim 1, a blast hose and a blast nozzle provided at an end of the blast hose.

18. The abrasive blasting apparatus as claimed in claim 17 comprising an air control valve; and a blast media valve wherein the control system is configured to control the air control valve to permit or prevent air to flow into the blast hose, and to control the blast media valve to permit or prevent blast media to flow into the blast hose.

19. The abrasive blasting apparatus as claimed in claim 17 wherein the deadman's switch is on the blast nozzle or on the blast hose adjacent the blast nozzle.

20. The abrasive blasting apparatus as claimed in claim 17 wherein, the abrasive blasting apparatus further comprises a choke valve wherein the control system is configured to control the choke valve to increase a pressure difference urging the blast media to flow through the blast media valve.

* * * * *